US008634354B2

(12) United States Patent
Rashid et al.

(10) Patent No.: US 8,634,354 B2
(45) Date of Patent: Jan. 21, 2014

(54) SESSION ESTABLISHMENT IN MULTI-CARRIER DATA TRANSMISSION SYSTEMS

(75) Inventors: Mohammed Humayun Rashid, San Diego, CA (US); Fahed Zawaideh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1211 days.

(21) Appl. No.: 12/111,123

(22) Filed: Apr. 28, 2008

(65) Prior Publication Data

US 2009/0109896 A1    Apr. 30, 2009

Related U.S. Application Data

(60) Provisional application No. 60/984,324, filed on Oct. 31, 2007.

(51) Int. Cl.
*H04W 4/00*    (2009.01)
(52) U.S. Cl.
USPC ............................ 370/329; 370/351; 370/462
(58) Field of Classification Search
USPC ......... 370/320, 329, 221, 225, 228, 229, 351, 370/341; 455/432.1, 434, 435.2
See application file for complete search history.

(56) References Cited

U.S. PATENT DOCUMENTS

| 5,633,858 | A * | 5/1997 | Chang et al. | 370/255 |
| 6,233,247 | B1 * | 5/2001 | Alami et al. | 370/441 |
| 7,031,717 | B2 * | 4/2006 | Mazzara | 455/450 |

(Continued)

FOREIGN PATENT DOCUMENTS

| JP | 2002320260 A | 10/2002 |
| JP | 2002374562 A | 12/2002 |

(Continued)

OTHER PUBLICATIONS

Anonymous: "Over-the-Air Service Provisioning of Mobile Stations in Spread Spectrum Systems;! TIA/EIA/IS-683-A" EIA/TIA Drafts, Telecommunications Industry Association, Arlington, VA, US, no. TIA/EIA/IS-683-A, Jun. 1, 1998, pp. 1-121, XP017004291 pp. 3-42-pp. 3-51.

(Continued)

*Primary Examiner* — Steven H Nguyen
*Assistant Examiner* — Henry Baron
(74) *Attorney, Agent, or Firm* — Kevin T. Cheatham

(57) ABSTRACT

An access terminal acquires a multi-carrier radio network on an acquisition channel, receives a list of available channels from the network, and hashes to a channel on which the access terminal attempts to establish a session. If the access terminal fails to establish the session, the access terminal selects a new acquisition channel from an acquisition table other than the acquisition table from which the original acquisition channel was selected. The access terminal then repeats the above steps in order to attempt to establish a session, beginning with acquisition on the new acquisition channel. In this way, the number of unsuccessful session establishment attempts resulting from back end network failures is typically reduced, shortening the time to successful session establishment, reducing power consumption by the access terminal, and lessening interference due to unsuccessful attempts to establish a session.

31 Claims, 3 Drawing Sheets

(56) References Cited

U.S. PATENT DOCUMENTS

| | | | |
|---|---|---|---|
| 7,505,437 | B2 | 3/2009 | Tiedemann, Jr. et al. |
| 7,877,793 | B2 * | 1/2011 | de Jong et al. .................... 726/9 |
| 2002/0193112 | A1 | 12/2002 | Aoki et al. |
| 2003/0129979 | A1 * | 7/2003 | Cooper ........................ 455/432 |
| 2003/0153327 | A1 | 8/2003 | Tajiri et al. |
| 2004/0236849 | A1 | 11/2004 | Cooper |
| 2005/0227688 | A1 | 10/2005 | Li et al. |
| 2006/0217124 | A1 | 9/2006 | Bi et al. |
| 2007/0115982 | A1 * | 5/2007 | Pope et al. .................... 370/392 |
| 2008/0064450 | A1 * | 3/2008 | Islam et al. .................. 455/574 |
| 2009/0217369 | A1 * | 8/2009 | Abeni et al. .................... 726/13 |

FOREIGN PATENT DOCUMENTS

| | | |
|---|---|---|
| JP | 2006270968 A | 10/2006 |
| JP | 2009503912 A | 1/2009 |
| WO | WO2006086497 A1 | 8/2006 |

OTHER PUBLICATIONS

International Search Report and the Written Opinion-PCT/US2008/081960, International Search Authority-European Patent Office-May 29, 2009.

Taiwan Search Report-TW097142233-TIPO-Dec. 20, 2011.

* cited by examiner

SESSION ESTABLISHMENT IN MULTI-CARRIER DATA TRANSMISSION SYSTEMS

CLAIM OF PRIORITY UNDER 35 U.S.C. §119

The present Application for Patent claims priority to U.S. Provisional Application No. 60/984,324, entitled "SESSION ESTABLISHMENT IN MULTI-CARRIER DATA TRANSMISSION SYSTEMS," filed Oct. 31, 2007, which is assigned to the assignee hereof and expressly incorporated herein by reference.

BACKGROUND

1. Field

The present invention relates generally to telecommunications, and, more specifically, to multi-carrier communications in wireless systems.

2. Background

A modern communication system is expected to provide reliable data transmission for a variety of applications, such as voice and data applications. In a point-to-multipoint communications context, known communication systems are based on frequency division multiple access (FDMA), time division multiple access (TDMA), code division multiple access (CDMA), and perhaps other multiple access communication schemes.

A CDMA system may be designed to support one or more CDMA standards, such as (1) the TIA/EIA-95 Mobile Station-Base Station Compatibility Standard for Dual-Mode Wideband Spread Spectrum Cellular System (this standard with its enhanced revisions A and B may be referred to as the "IS-95 standard"), (2) the TIA/EIA-98-C Recommended Minimum Standard for Dual-Mode Wideband Spread Spectrum Cellular Mobile Station (the "IS-98 standard"), (3) the standard sponsored by a consortium named 3rd Generation Partnership Project (3GPP) and embodied in a set of documents including Document Nos. 3G TS 25.211, 3G TS 25.212, 3G TS 25.213, and 3G TS 25.214 (the "W-CDMA standard"), (4) the standard sponsored by a consortium named 3rd Generation Partnership Project 2 (3GPP2) and embodied in a set of documents including TR-45.5 Physical Layer Standard for cdma2000 Spread Spectrum Systems, the C.S0005-A Upper Layer (Layer 3) Signaling Standard for cdma2000 Spread Spectrum Systems, and the TIA/EIA/IS-856 cdma2000 High Rate Packet Data Air Interface Specification (the "cdma2000 standard" collectively), (5) the 1xEV-DO standard, and (6) certain other standards.

Multi-carrier communication systems are being developed and deployed to satisfy the constantly increasing demand for wireless services, including both data services and voice services. A multi-carrier communication system is a system with the capability to transmit information on two or more carrier frequencies. It should be noted that multi-carrier system capability may exist in both downlink and uplink connections; alternatively, a multi-carrier system may have multi-carrier capability only on uplink or only on downlink. "Downlink" signifies forward direction of information transmission, i.e., transmission from the radio network to an access terminal, such as a cellular telephone, PDA, or computer. "Uplink" signifies transmission of information in the reverse direction, i.e., from an access terminal to the radio network.

In some multi-carrier cellular communication systems, an access terminal performing a cold acquisition, (1) attempts to acquire a channel on a system acquisition frequency, (2) receives a listing of available frequency channels on the acquired channel (i.e., via overhead message(s) of the system acquisition channel), (3) uses the AT's internal hashing function to determine which frequency channel from among the available frequency channels to use for communicating with the radio network, (4) acquires the channel on the frequency channel indicated by the hashing function, and then (5) tries to establish a session with the radio network on that latter "hashed to" frequency channel. (Cold acquisition may be performed upon power up, exit from a reset state, or entry into a new cell, for example.) If the AT fails to establish the session, it may again attempt to acquire the system, hash to a channel, and establish a session again, using either the same system acquisition frequency channel as it used initially or another frequency channel from the same "GEO" list of frequency channels as the initial system acquisition frequency channel. Each such attempt uses valuable time, power, and spectrum.

There is a need in the art to reduce the time for establishing a session between access terminals and radio networks. There is also a need to reduce power consumption in access terminals, without unnecessarily impairing communication and other functionality of the access terminals or the radio networks. There is a further need to decrease spectrum use by access terminals and radio networks, also without unnecessarily impairing communication and other functionality of the access terminals or the radio networks.

SUMMARY

Embodiments disclosed herein address the needs described above by providing methods, apparatus, and machine-readable articles of manufacture for establishing sessions between access terminals and multi-carrier radio networks.

In an embodiment, an access terminal includes a transceiver configured to communicate with one or more multi-carrier radio networks. The access terminal also includes one or more memory devices storing code and a preferred roaming list. The preferred roaming list includes a plurality of geographic area (GEO) tables, each GEO table of the plurality of GEO tables having a plurality of acquisition tables, with each acquisition table of the plurality of acquisition tables including a plurality of channels. The access terminal also includes a controller coupled to the transceiver and to the one or more memory devices. The processor is configured to execute the code to cause the access terminal to perform these steps:

(a) selecting a first acquisition channel from a first acquisition table stored in the memory,
(b) acquiring the first acquisition channel,
(c) receiving one or more overhead messages on the first acquisition channel, the one or more overhead messages including identifiers of channels available to the access terminal (for example, made available to the access terminal by the radio network in the particular geographic area where the terminal is located),
(d) generating a session seed,
(e) executing a hashing function using the identifiers and the session seed to obtain a selected channel from among the channels available,
(f) acquiring the selected channel,
(g) attempting to establish a session through the selected channel, and
(h) if the step of attempting fails to establish the session, selecting a second acquisition channel from a second acquisition table stored in the memory, the second acquisition table being different from the first acquisition table, and repeating the steps (a) through (g).

The step of selecting the second acquisition channel is performed after a single failure to establish a session.

In an embodiment, a method is provided for communication between an access terminal and a multi-carrier radio network. The access terminal has a memory storing a preferred roaming list with a plurality of GEO tables, each GEO table of the plurality of GEO tables having a plurality of acquisition tables with each acquisition table of the plurality of acquisition tables including a plurality of channels. The method includes these steps:
 (a) selecting a first acquisition channel from a first acquisition table stored in the memory;
 (b) acquiring the first acquisition channel;
 (c) receiving one or more overhead messages on the first acquisition channel, the one or more overhead messages comprising identifiers of channels available to the access terminal;
 (d) generating a session seed;
 (e) executing a hashing function using the identifiers and the session seed to obtain a selected channel from among the channels available;
 (f) acquiring the selected channel;
 (g) attempting to establish a session through the selected channel;
 (h) if the step of attempting fails to establish the session, selecting a second acquisition channel from a second acquisition table stored in the memory, the second acquisition table being different from the first acquisition table, and repeating the steps (a) through (g).

The step of selecting the second acquisition channel is performed after a single failure to establish a session.

In an embodiment, a machine-readable medium includes instructions. The instructions can be executed by a processor of an access terminal. The access terminal stores a preferred roaming list, possibly in the machine-readable medium. The preferred roaming list has a plurality of GEO tables. Each of the GEO tables includes a plurality of acquisition tables, with each acquisition table of the plurality of acquisition tables having a plurality of channels. When the instructions are executed by the processor, they cause the access terminal to perform the following steps:
 (a) selecting a first acquisition channel from a first acquisition table stored in the access terminal;
 (b) acquiring the first acquisition channel;
 (c) receiving one or more overhead messages on the first acquisition channel, the one or more overhead messages comprising identifiers of channels available to the access terminal;
 (d) generating a session seed;
 (e) executing a hashing function using the identifiers and the session seed to obtain a selected channel from among the channels available;
 (f) acquiring the selected channel;
 (g) attempting to establish a session through the selected channel; and
 (h) if the step of attempting fails to establish the session, selecting a second acquisition channel from a second acquisition table stored in the access terminal, the second acquisition table being different from the first acquisition table, and repeating the steps (a) through (g).

The step of selecting the second acquisition channel is performed after a single failure to establish a session.

In an embodiment, an access terminal includes a means for communicating with one or more multi-carrier radio networks. The access terminal also includes a means for storing code and a preferred roaming list. The preferred roaming list has a plurality of GEO tables, each GEO table of the plurality of GEO tables having a plurality of acquisition tables with acquisition table having a plurality of channels. The access terminal further includes a means for executing the code to cause the access terminal to perform the following steps:
 (a) selecting a first acquisition channel from a first acquisition table stored in the memory,
 (b) acquiring the first acquisition channel,
 (c) receiving one or more overhead messages on the first acquisition channel, the one or more overhead messages comprising identifiers of channels available to the access terminal,
 (d) generating a session seed,
 (e) executing a hashing function using the identifiers and the session seed to obtain a selected channel from among the channels available,
 (f) acquiring the selected channel,
 (g) attempting to establish a session through the selected channel, and
 (h) if the step of attempting fails to establish the session, selecting a second acquisition channel from a second acquisition table stored in the memory, the second acquisition table being different from the first acquisition table, and repeating the steps (a) through (g).

The step of selecting the second acquisition channel is performed after a single failure to establish a session.

These and other embodiments and aspects of the present invention will be better understood with reference to the following description, drawings, and appended claims.

DETAILED DESCRIPTION

Figure 1:
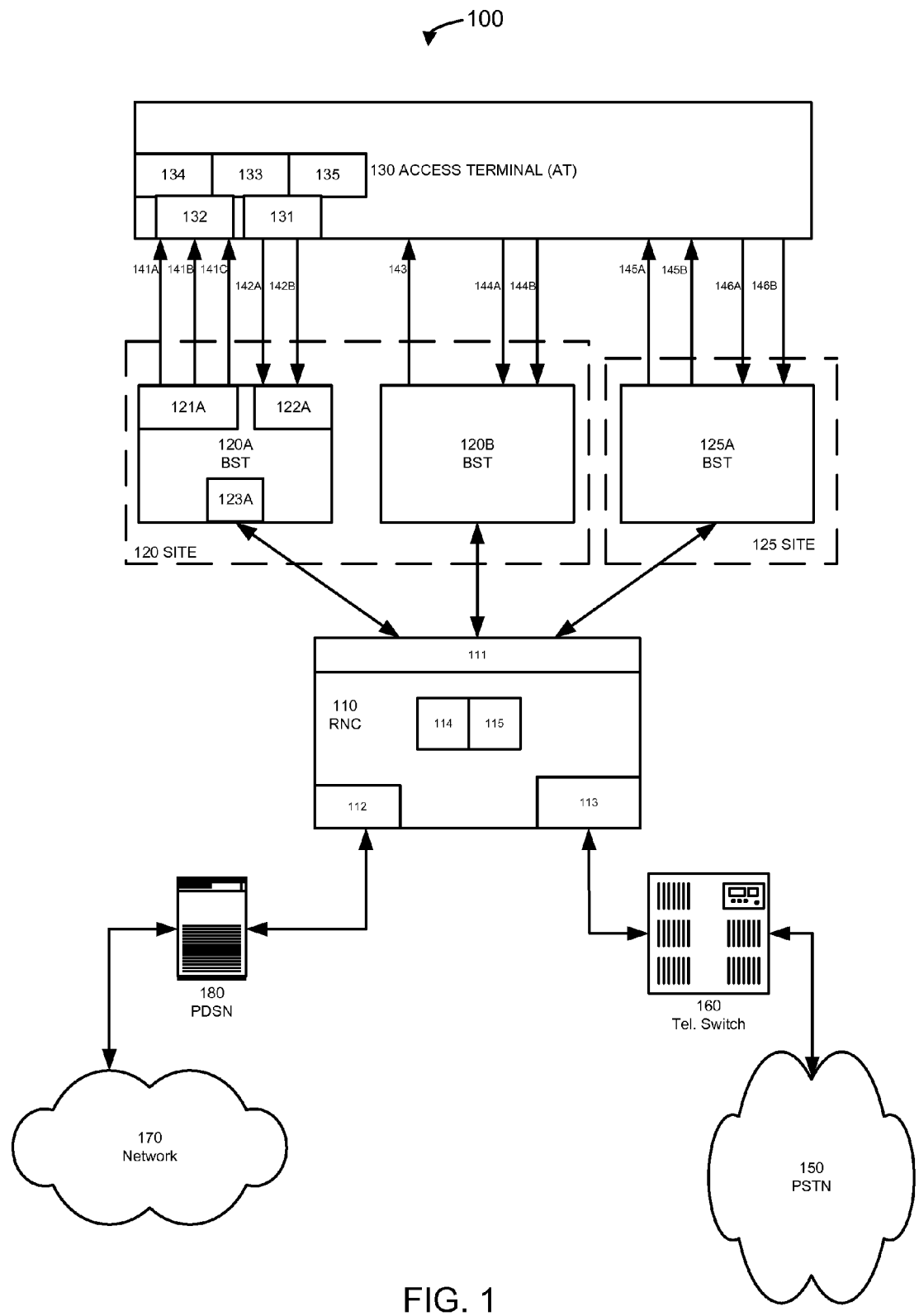
FIG. 1 illustrates selected components of a multi-carrier communication network and access terminals configured for communication with the network.

In this document, the words "embodiment," "variant," and similar expressions are used to refer to specific apparatus, process(es), or article(s) of manufacture, and not necessarily to the same apparatus, process(es), or article(s) of manufacture. Thus, "one embodiment" (or a similar expression) used in one place or context can refer to a particular apparatus, process, or article of manufacture; the same or a similar expression in a different place can refer to a different apparatus, process, or article of manufacture. The expression "alternative embodiment" and similar phrases are used to indicate one of a number of different possible embodiments. The number of possible embodiments is not necessarily limited to two or any other quantity.

The word "exemplary" is used herein to mean "serving as an example, instance, or illustration." Any embodiment described herein as "exemplary" is not necessarily to be construed as preferred or advantageous over other embodiments. All of the embodiments described in this description are exemplary embodiments provided to enable persons skilled in the art to make or use the invention, and not to limit the scope of legal protection afforded the invention, which is defined by the claims and their equivalents.

A subscriber station, referred to herein as "user equipment," "UE," "user equipment device," "access terminal," or "AT," may be mobile or stationary, and may communicate with one or more base transceiver stations. An access terminal may be any of a number of types of devices, including but not limited to PC card, external or internal modem, wireless telephone, and a personal digital assistant (PDA) with wireless communication capability. An access terminal transmits and receives data packets to or from a radio network controller through one or more base transceiver stations.

Base transceiver stations and base station controllers are parts of a network called "radio network," "RN," "access network," or "AN." A base station controller may also be referred to as a radio network controller or "RNC." A radio network may be a UTRAN or UMTS Terrestrial Radio Access Network. The radio network may transport data packets between multiple access terminals. The radio network may be further connected to additional networks outside the radio network, such as a corporate intranet, the Internet, or a conventional public switched telephone network ("PSTN"), and may transport data packets between each user access terminal and such outside networks.

The expression "cold acquisition" and similar phrases denote system acquisition by access terminals. For example, an AT can perform a cold acquisition procedure when it is powered up within a cell, when it is reset within a cell, or when it enters an area served by the cell, acquiring a system acquisition channel carrier (or anchor channel carrier) in the cell.

A "channel" is a channel associated with a frequency carrier. Channels are defined in the IS-95 and IS-856 CDMA standards.

A "session" is a set of attributes that define interoperation of an access terminal with a radio network, typically including over-the-air parameters and authentication information. The parameters may be negotiated between a base station of the radio network and the access terminal. Establishment of a session typically includes (1) establishment of a link between the access terminal and the base station, and (2) establishment, through the base station, of a Point-to-Point Protocol ("PPP") between the access terminal and a Packet Data Serving Node ("PDSN").

FIG. 1 illustrates selected components of a communication network 100, which includes a radio network controller 110 coupled to wireless base station transceivers 120A, 120B, and 125A. The base transceiver stations 120A and 120B are parts of a site 120, each corresponding to a different sector (cell) of this site. The base transceiver station 125A is part of a different site 125.

The base transceiver station 120A is configured to send data to an access terminal 130 through one or more downlink wireless carriers 141A, 141B, and 141C; the transceiver 120A is further configured to receive data from the AT 130 through one or more uplink wireless carriers 142A and 142B. The base transceiver station 120B is configured to send data to the AT 130 through downlink wireless carrier 143, and to receive data from the AT 130 through one or more uplink wireless carriers 144A and 144B. The base transceiver station 125A is configured to send data to and receive data from the AT 130 using, respectively, downlink wireless carriers 145A/B and uplink wireless carriers 146A/B. Each of the carriers 141-146 may correspond to a different frequency. The downlink data streams from different transceivers (cells) to the AT 130 may be different, but there may also be periods when several transceivers transmit the same data to the AT 130 concurrently.

The radio network controller 110 is coupled to a public switched telephone network 150 through a telephone switch 160, and to a packet switched network 170 through a packet data server node 180. Data interchange between various network elements, such as the radio network controller 110 and the packet data server node 180, can be implemented using any number of protocols. The protocols may include, for example, Internet Protocol (IP), asynchronous transfer mode (ATM) protocol, T1, E1, frame relay, other protocols, and combinations of these protocols.

The communication network 100 provides both data communication services and telephone (voice) services to the AT 130. In alternative embodiments, the communication network 100 may provide only data or only telephone services. In yet other alternative embodiments, the communication network 100 may provide services such as video transmission services, either alone or in combination with telephone services, and other services.

The AT 130 may be, or may include, a wireless telephone, wireless modem, personal digital assistant, wireless local loop apparatus, and other communication devices. The AT 130 is configured to communicate data in the forward and reverse directions using at least one transmission protocol, such as a protocol consistent with the wireless packet transmission protocols described above. The AT 130 may include a wireless transmitter 131, a wireless receiver 132, a controller 133 (e.g., a microcontroller) executing program code, memory devices 134 (e.g., RAM, ROM, PROM, EEPROM, and other memories, one or more of which devices may store the program code), human interface devices 135 (e.g., display, keypad, keyboard, pointing device), and other components. In some variants, an access terminal may include multiple instances of these components, for example, multiple receivers and/or multiple transmitters.

Each of the base transceiver stations 120A/B and 125 includes one or more wireless receivers (such as a receiver 122A of the transceiver 120A), one or more wireless transmitters (such as a transmitter 121A of the transceiver 120A), and a base station controller interface (such as an interface 123A). A receiver/transmitter pair of each base station is configured by a processor operating under control of program code to establish forward and reverse links with the AT 130 in order to send data packets to and receive data packets from the AT 130 over the air interface. In the case of data services, for example, the base transceiver stations 120/125 may receive forward link data packets from the packet switched network 170 through the packet data server node 180 and through the radio network controller 110, and transmit these packets to the AT 130. The base transceiver stations 120/125 may receive reverse link data packets that originate at the AT 130, and forward these packets to the packet switched network 170 through the radio network controller 110 and the packet data server node 180. In the case of telephone services, the base transceiver stations 120/125 may receive forward link data packets from the telephone network 150 through the telephone switch 160 and through the radio network controller 110, and transmit these packets to the AT 130. Voice carrying packets originating at the AT 130 may be received at the base transceiver stations 120/125 and forwarded to the telephone network 150 via the radio network controller 110 and the telephone switch 160.

The radio network controller 110 includes one or more interfaces 111 to the base transceiver stations 120/125, an interface 112 to the packet data server node 180, and an interface 113 to the telephone switch 160. The interfaces 111, 112, and 113 may operate under control of one or more processors 114 executing program code stored in one or more memory devices 115.

As illustrated in FIG. 1, the network 100 includes one public switched telephone network, one packet switched network, one base station controller, three transceivers, and one access terminal. A person skilled in the art would recognize, after perusal of this document, that alternative embodiments in accordance with aspects of the invention need not be limited to any particular number of these components. For example, a lesser or a greater number of base transceiver stations and access terminals may be included in some embodiments. Furthermore, the communication network 100 may connect the access terminal 130 to one or more additional communication networks, for example, to a second wireless communication network having a number of wireless access terminals.

A particular AT (e.g., the AT 130) may attempt the initial channel (or system) acquisition on the frequency last used successfully (i.e., used during the immediately preceding successful attempt) by the AT for acquiring the radio network system or for receiving service from the radio network.

After acquiring the system on one carrier, the AT may download one or more overhead messages, which may include the list/number of the channels available to the AT. The AT may then use a hashing function to determine the particular carrier from among the available carriers for establishing a session with the RN. A hashing function may receive the number of the carriers and a session seed, and generate an index for the carrier to use in establishing the session. The session seed may be the current system time, for example, or another random or pseudo random number. If channels with indices 1-6 are available, for example, the hashing function may select one of these indices. In operation, the use of hashing functions by the access terminals tends to distribute evenly the load due to the ATs among the multiple channels/carriers available in a given area.

Generally, the ATs store the frequencies for acquisition and service in a preferred roaming list ("PRL"). PRLs may be pre-programmed in the AT when service is initiated, and/or programmed with over-the-air data transfers. PRL structure may include a system table and an acquisition table. The system table may include a list of permitted and forbidden systems/networks, which is organized by geographic areas ("GEOs"). A table may be provided for each geographic area, and this table may include a first section for permitted or accessible systems/networks and a second section for forbidden or inaccessible systems/networks. The accessible systems/networks include systems/networks that the access terminal is allowed to access.

The table for each geographic area may include (1) an entry or record for each system/network present in the table, and (2) multiple fields or columns for pertinent information for each entry. These fields may include system (SID, NID) fields, a selection preference field, a roaming indicator field, and an acquisition index field. For each entry, the system fields store the (SID, NID) pair assigned to the system/network associated with that entry. The selection preference field indicates the preference for the associated system/network among all of the permitted systems/networks within the same geographic area. The network operator typically specifies the preference. The roaming indicator field includes a roaming indicator that is displayed by the access terminal when receiving a signal from the associated system/network. The acquisition index field may include an index value that points to a specific entry in the acquisition table containing the parameters to use to acquire the associated system/network.

The acquisition table may include one entry for each unique index value and multiple fields for various parameters to use for system acquisition. A preferred roaming list structure is described in more detail in a TIA-683-C document, entitled "Over-the-Air Service Provisioning of Mobile Stations in Spread Spectrum Systems," which is publicly available. The TIA-683-C document is also known as "3GPP2 C.S0016-B."

Additional details of selected PRL variants are available in commonly assigned U.S. patent application Ser. No. 10/607, 966, filed on Jun. 27, 2003. For purposes of the present discussion, FIG. 2 illustrates, in a simplified form, a PRL 200.

The PRL 200 includes GEO tables 210. Each one of the GEO tables 210 is a list of acquisition tables 220. Each of the acquisition tables 220 is a prioritized list of channels 230. In some variants, the same channel does not have the same priority in multiple acquisition tables 220. For example, a channel on a frequency F1 may have the highest priority only in a single acquisition table 220. This may apply to all or some of the channels.

Figure 2:
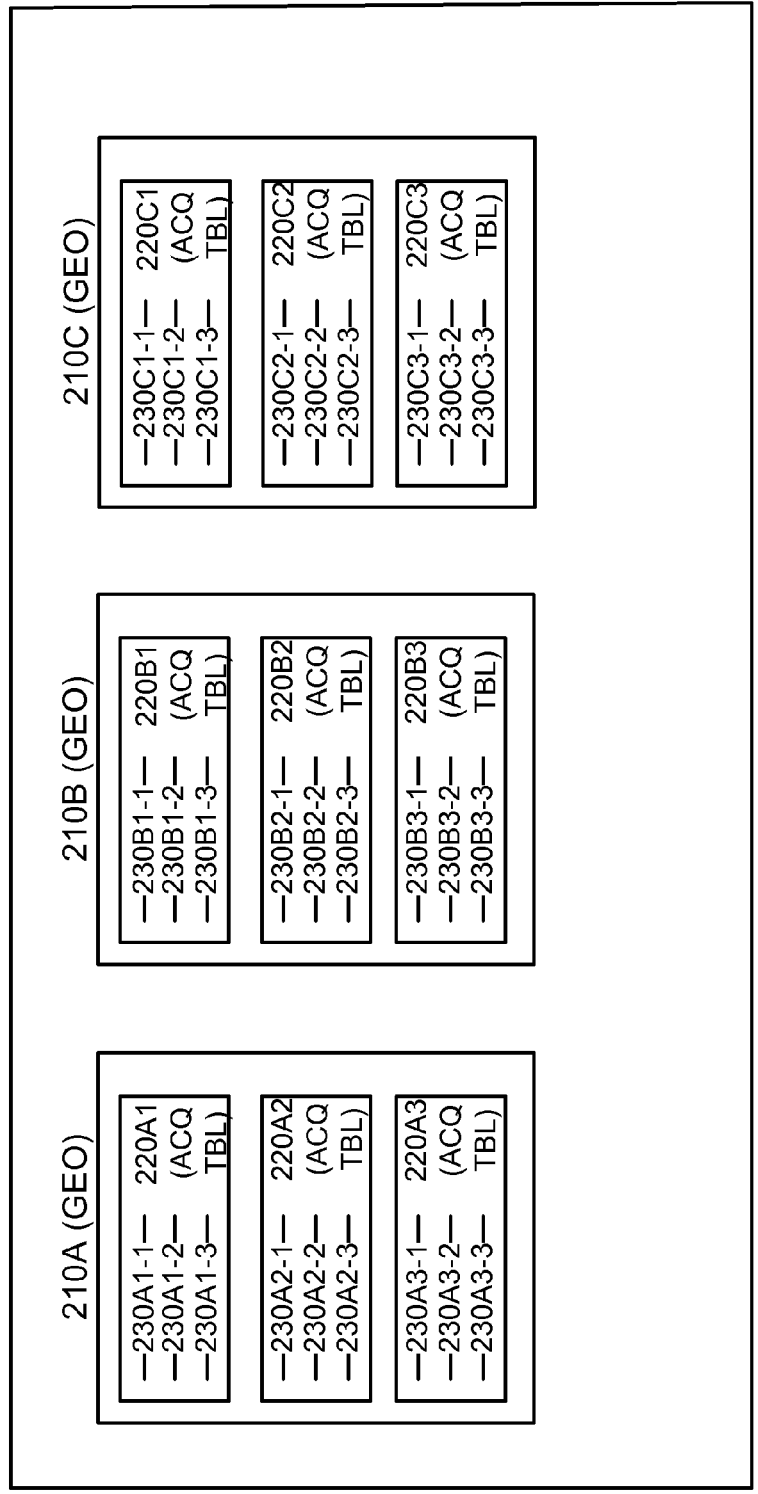
FIG. 2 is a simplified illustration of a preferred roaming list structure.

It should be noted that the number of GEO tables 210 in the PRL 200 may differ from the number shown in FIG. 2. Similarly, the numbers of acquisition tables and channels may also differ.

Generally, an AT (e.g., the AT 130) may select the last used channel or the highest priority channel from its current acquisition table in order to acquire the system, "hash to" a different or the same channel, and then establish a session. In an embodiment, if the AT acquires the system using a channel selected from a first acquisition table but session establishment fails, the AT then selects the next channel for acquisition from a second acquisition table different from the first (i.e., current) acquisition table. In a variant, the switch from the first to the second acquisition table takes place after a single failure of session establishment, i.e., immediately after session establishment fails through a channel hashed to previously.

Figure 3:
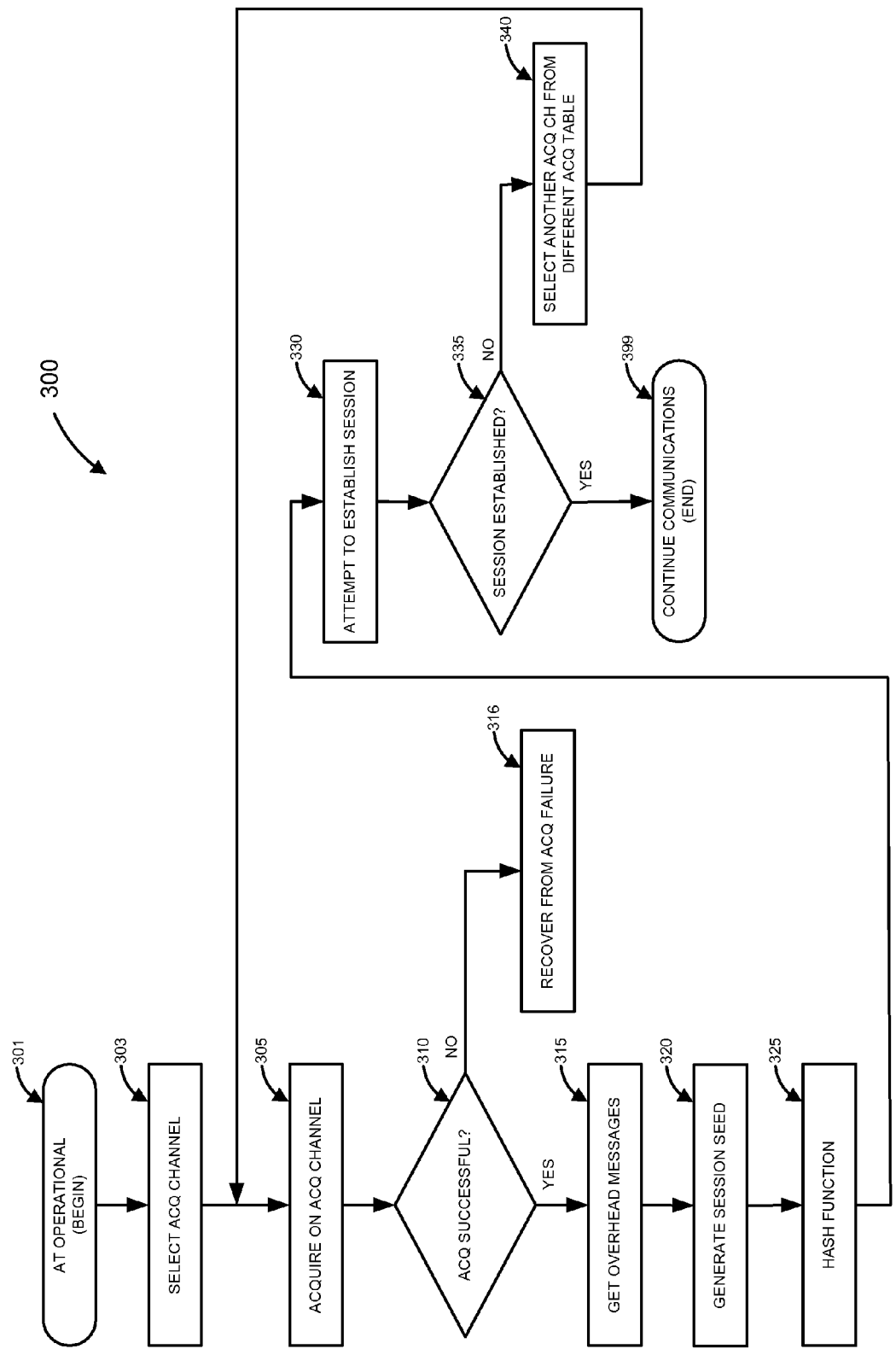
FIG. 3 illustrates selected steps and decision blocks of a process for establishing a session, in accordance with an embodiment of the present invention.

FIG. 3 illustrates selected steps of a process 300 for establishing a session between an AT (e.g., the AT 130) and a network that includes a radio network.

At flow point 301, an access terminal is operational.

At step 303, the access terminal selects a current acquisition channel from a first acquisition table of the PRL stored in the memory of the access terminal. For example, the current acquisition channel initially selected may be the highest priority channel from the first acquisition table.

Proceeding to step 305, the access terminal attempts to acquire the current acquisition channel (synchronize with the system to obtain messages from the system, such as overhead messages).

At decision block 310, the access terminal determines whether the acquisition channel was acquired. If the acquisition channel was acquired, process flow advances to step 315. Otherwise, process flow is diverted to steps/blocks 316; here, the access terminal may, for example, select another acquisition channel from the same or a different acquisition table to attempt to acquire the system.

In the step 315, the access terminal receives one or more overhead messages through the acquisition channel acquired in the step 305. The received overhead messages may include the number of channels available from the system at the current geographic location of the access terminal, and the indices of the available channels. The indices essentially identify the available channels.

With the channel indices available, the access terminal generates a session seed number, at step 320. The session seed number may be (or may be derived from) the current system time; it may also be obtained from a random or pseudo random number generator.

At step 325, the access terminal inputs the session seed and the channel indices into a hashing function, such as a polynomial function. The hashing function is essentially a reproducible method of turning some kind of input data into a relatively small number that may serve as a digital "fingerprint" of the data. Here, the session seed is the input data, and the selected index of the channel on which the access terminal may try to establish a session is the "fingerprint." The hashing function may be highly non-linear, for substantially randomizing operation. The hashing function may operate so that the probability of selecting a particular index is substantially the same for all the indices. In other words, probability of selecting a particular channel (corresponding to a particular channel index) is substantially the same for all the available channels from among which the particular channel is selected. For example, probabilities for all indices may be within ten percent of each other; that is, the ratio of the highest index probability to the lowest index probability does not exceed 1.1.

At step 330, the access terminal attempts to establish a session on the selected channel, i.e., on the channel corresponding to the index output by the hashing function. The selected channel may be referred to as the "hashed to" channel.

The success of the step 330 is determined in decision block 335. If the session was successfully established, process flow proceeds from the decision block 335 to flow point 399, where the process 300 terminates and the access terminal proceeds to communicate with the network using the hashed to channel and the established session.

If the session was not successfully established in the step 330, as determined in the decision block 335, process flow proceeds to step 340. In this step, the access terminal selects another current acquisition channel from a second acquisition table. For example, the current acquisition channel may be the highest priority channel of the second acquisition table. Note that the second acquisition table is different from the first acquisition table. The second acquisition table may be selected from the same GEO table set as the first acquisition table.

The process flow then returns to the step 305, and the process 300 is repeated using the new current acquisition channel, and a new session seed. If a session is not established in this iteration, the steps of the process 300 may be repeated again, with yet another acquisition channel selected from an acquisition table other than the second acquisition table, and so on. In each iteration, a new session seed may be used.

If the failure to establish a session is due to a problem on the network's back end, selection of a new channel from the same acquisition table as the channel that resulted in the failure is likely to be futile; the cause of the problem is not on the front end and consequently the cause will not be eliminated by switching to another channel/carrier. The front end in this context is essentially the BTSs. The back end in the same context includes all other network components, such as RNCs; PDSNs; Authentication, Authorization and Accounting nodes/servers (AAAs); Foreign Agents (FAs); and Home Agents (HAs). Thus, the switch to a new acquisition table often speeds up the eventual establishment of a session, for example, when the initial acquisition channel belongs to a different service provider within the area to which the access terminal has been moved.

Although steps and decisions of one or more methods have been described serially in this disclosure, some of these steps and decisions may be performed by separate elements in conjunction or in parallel, asynchronously or synchronously, in a pipelined manner, or otherwise. There is not necessarily a particular requirement that the steps and decisions be performed in the same order in which this description lists them and the accompanying drawings illustrate them, except where explicitly so indicated, otherwise made clear from the context, or inherently required. In specific variants, however, the steps and decisions are performed in the particular order(s) described in this disclosure and illustrated in the accompanying drawings. Furthermore, not every illustrated step and decision is necessarily required in every embodiment in accordance with the invention, while some steps that have not been specifically illustrated may be desirable or necessary in some embodiments in accordance with the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To show clearly this interchangeability of hardware and software, various illustrative components, blocks, modules, circuits, and steps have been described above generally in terms of their functionality. Whether such functionality is implemented as hardware, software, or combination of hardware and software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code In the form of instructions or data structures and that can be accessed by a computer. Also, any connection is properly termed a computer-readable medium. For example, If the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as Infrared, radio, and microwave are Included In the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

What is claimed is:

1. An access terminal, comprising:
   a transceiver configured to communicate with one or more multi-carrier radio networks;
   one or more memories storing code and a preferred roaming list, the preferred roaming list comprising a plurality of geographic area (GEO) tables, each GEO table of the plurality of GEO tables comprising a plurality of acquisition tables, each acquisition table of the plurality of acquisition tables comprising a plurality of channels; and
   a controller coupled to the transceiver and to the one or more memories, the controller is configured to:
      (a) select a first acquisition channel from a first acquisition table stored in the memory,
      (b) acquire the first acquisition channel,
      (c) receive one or more overhead messages on the first acquisition channel, the one or more overhead messages comprising identifiers of channels available to the access terminal,
      (d) generate a session seed,
      (e) execute a hashing function using the identifiers and the session seed to obtain a selected channel from among the channels available,
      (f) acquire the selected channel,
      (g) perform an attempt to establish a session through the selected channel, and
      (h) if the attempt to establish a session fails, select a second acquisition channel from a second acquisition table stored in the memory, the second acquisition table being different from the first acquisition table, and repeat the steps (a) through (g);
   wherein the controller is configured to select the second acquisition channel and repeat the steps (a) through (g) after a single failure to establish session.

2. The access terminal of claim 1, wherein the controller is further configured to:
   generate the session seed based on current system time of the access terminal.

3. The access terminal of claim 1, wherein the plurality of channels in each acquisition table is in a prioritized order, and the controller is further configured to select the first acquisition channel so that the first acquisition channel has highest priority in the first acquisition table.

4. The access terminal of claim 3, wherein the controller is further configured to select the second acquisition channel so that the second acquisition channel has highest priority in the second acquisition table.

5. The access terminal of claim 1, wherein the controller is further configured to select the first acquisition channel so that the first acquisition channel corresponds to a frequency last used successfully by the access terminal to receive service from a radio network.

6. The access terminal of claim 1, wherein the hashing function is a polynomial function.

7. The access terminal of claim 1, wherein the hashing function is a non-linear function.

8. The access terminal of claim 1, wherein the hashing function is such that probabilities of selecting particular channels from among the channels available are substantially equal.

9. The access terminal of claim 1, wherein the hashing function is such that probabilities of selecting particular channels from among the channels available are within ten percent of each other.

10. The access terminal of claim 1, wherein the first acquisition table and the second acquisition table are in the same GEO table.

11. A method of communicating between an access terminal and a multi-carrier radio network, wherein the access terminal comprises a memory storing a preferred roaming list, the preferred roaming list comprising a plurality of GEO tables, each GEO table of the plurality of GEO tables comprising a plurality of acquisition tables, each acquisition table of the plurality of acquisition tables comprising a plurality of channels, the method comprising:
   (a) selecting a first acquisition channel from a first acquisition table stored in the memory;
   (b) acquiring the first acquisition channel;
   (c) receiving one or more overhead messages on the first acquisition channel, the one or more overhead messages comprising identifiers of channels available to the access terminal;
   (d) generating a session seed;
   (e) executing a hashing function using the identifiers and the session seed to obtain a selected channel from among the channels available;
   (f) acquiring the selected channel;
   (g) attempting to establish a session through the selected channel; and
   (h) if the step of attempting fails to establish the session, selecting a second acquisition channel from a second acquisition table stored in the memory, the second acquisition table being different from the first acquisition table, and repeating the steps (a) through (g);
   wherein the step of selecting the second acquisition channel is performed after a single failure to establish a session.

12. The method of claim 11, wherein the step of generating is performed so that the session seed is based on current system time of the access terminal.

13. The method of claim 11, wherein the plurality of channels in each acquisition table is in a prioritized order, and the step of selecting the first acquisition channel is performed so that the first acquisition channel has highest priority in the first acquisition table.

14. The method of claim 13, wherein the step of selecting the second acquisition channel is performed so that the second acquisition channel has highest priority in the second acquisition table.

15. The method of claim 11, wherein the step of selecting the first acquisition channel is performed so that the first acquisition channel corresponds to a frequency last used successfully by the access terminal to receive service from a radio network.

16. The method of claim 11, wherein the hashing function is a polynomial function.

17. The method of claim 11, wherein the hashing function is a non-linear function.

18. The method of claim 11, wherein the hashing function is such that probabilities of selecting particular channels from among the channels available are substantially equal.

19. The method of claim 11, wherein the hashing function is such that probabilities of selecting particular channels from among the channels available are within ten percent of each other.

20. The method of claim 11, wherein the first acquisition table and the second acquisition table are in the same GEO table.

21. A non-transient machine-readable medium comprising instructions, that when executed by at least one processor of an access terminal comprising a preferred roaming list, the preferred roaming list comprising a plurality of GEO tables, each GEO table of the plurality of GEO tables comprising a plurality of acquisition tables, each acquisition table of the plurality of acquisition tables comprising a plurality of channels, cause the access terminal to perform steps comprising:
  (a) selecting a first acquisition channel from a first acquisition table stored in the access terminal;
  (b) acquiring the first acquisition channel;
  (c) receiving one or more overhead messages on the first acquisition channel, the one or more overhead messages comprising identifiers of channels available to the access terminal;
  (d) generating a session seed;
  (e) executing a hashing function using the identifiers and the session seed to obtain a selected channel from among the channels available;
  (f) acquiring the selected channel;
  (g) attempting to establish a session through the selected channel; and
  (h) if the step of attempting fails to establish the session, selecting a second acquisition channel from a second acquisition table stored in the access terminal, the second acquisition table being different from the first acquisition table, and repeating the steps (a) through (g);
  wherein the step of selecting the second acquisition channel is performed after a single failure to establish a session.

22. The machine-readable medium of claim 21, wherein the step of generating is performed so that the session seed is based on current system time of the access terminal.

23. The machine-readable medium of claim 21, wherein the plurality of channels in each acquisition table is in a prioritized order, and the step of selecting the first acquisition channel is performed so that the first acquisition channel has highest priority in the first acquisition table.

24. The machine-readable medium of claim 23, wherein the step of selecting the second acquisition channel is performed so that the second acquisition channel has highest priority in the second acquisition table.

25. The machine-readable medium of claim 21, wherein the step of selecting the first acquisition channel is performed so that the first acquisition channel corresponds to a frequency last used successfully by the access terminal to receive service from a radio network.

26. The machine-readable medium of claim 21, wherein the hashing function is a polynomial function.

27. The machine-readable medium of claim 21, wherein the hashing function is a non-linear function.

28. The machine-readable medium of claim 21, wherein the hashing function is such that probabilities of selecting particular channels from among the channels available are substantially equal.

29. The machine-readable medium of claim 21, wherein the hashing function is such that probabilities of selecting particular channels from among the channels available are within ten percent of each other.

30. The machine-readable medium of claim 21, wherein the first acquisition table and the second acquisition table are in the same GEO table.

31. An access terminal, comprising:
  means for communicating with one or more multi-carrier radio networks;
  means for storing code and a preferred roaming list, the preferred roaming list comprising a plurality of GEO tables, each GEO table of the plurality of GEO tables comprising a plurality of acquisition tables, each acquisition table of the plurality of acquisition tables comprising a plurality of channels; and
  means for executing the code to cause the access terminal to perform steps comprising:
    (a) selecting a first acquisition channel from a first acquisition table stored in the memory,
    (b) acquiring the first acquisition channel,
    (c) receiving one or more overhead messages on the first acquisition channel, the one or more overhead messages comprising identifiers of channels available to the access terminal,
    (d) generating a session seed,
    (e) executing a hashing function using the identifiers and the session seed to obtain a selected channel from among the channels available,
    (f) acquiring the selected channel,
    (g) attempting to establish a session through the selected channel, and
    (h) if the step of attempting fails to establish the session, selecting a second acquisition channel from a second acquisition table stored in the memory, the second acquisition table being different from the first acquisition table, and repeating the steps (a) through (g);
  wherein the step of selecting the second acquisition channel is performed after a single failure to establish a session.

* * * * *